(12) United States Patent
Fu et al.

(10) Patent No.: US 11,851,134 B2
(45) Date of Patent: Dec. 26, 2023

(54) SILENT DRIVE CHAIN SYSTEM FOR MOTORCYCLE REAR DRIVE AND MOTORCYCLE

(71) Applicant: QINGDAO CHOHO INDUSTRIAL CO., LTD., Qingdao (CN)

(72) Inventors: Zhenming Fu, Qingdao (CN); Yumo Jin, Qingdao (CN)

(73) Assignee: QINGDAO CHOHO INDUSTRIAL CO., LTD, Qingdao (CN)

( * ) Notice: Subject to any disclaimer, the term of this patent is extended or adjusted under 35 U.S.C. 154(b) by 217 days.

(21) Appl. No.: 17/471,201

(22) Filed: Sep. 10, 2021

(65) Prior Publication Data
US 2022/0161892 A1     May 26, 2022

Related U.S. Application Data

(63) Continuation of application No. PCT/CN2021/089493, filed on Apr. 25, 2021.

(30) Foreign Application Priority Data

Nov. 25, 2020 (CN) .......................... 202011336533.9

(51) Int. Cl.
    *B62M 9/00*         (2006.01)
    *F16G 13/04*       (2006.01)

(52) U.S. Cl.
    CPC .............. *B62M 9/00* (2013.01); *F16G 13/04* (2013.01)

(58) Field of Classification Search
    CPC ................................. B62M 9/00; F16G 13/04
(Continued)

(56) References Cited

U.S. PATENT DOCUMENTS 4,094,515 A * 6/1978 Araya .................. F16J 15/3236
                                                                                     277/402
5,236,400 A * 8/1993 Tsuyama ................. F16G 13/04
                                                                                     474/217

(Continued)

FOREIGN PATENT DOCUMENTS

CN         201802814 U     4/2011
CN         104389950 A     3/2015

(Continued)

OTHER PUBLICATIONS

International Search Report issued in corresponding International application No. PCT/CN2021/089493, dated Aug. 12, 2021.

(Continued)

*Primary Examiner* — Gene O Crawford
*Assistant Examiner* — Emily R Kincaid
(74) *Attorney, Agent, or Firm* — Georgi Korobanov

(57) ABSTRACT

The silent drive chain system for a motorcycle rear drive includes a small chain wheel, a large chain wheel and a silent drive chain, where the silent drive chain is a toothed chain and includes: an outer chain plate, inner chain plates, a guide plate, a pin, a sleeve and a damping sealing ring; the sleeve is in interference fit with mounting holes of both the inner chain plate and the guide plate and forms an inner chain link together with the inner chain plate and the guide plate, the pin penetrates into the sleeve and is in clearance fit with the sleeve, two ends of the pin are in interference fit with a mounting hole of the outer chain plate, and form an outer chain link together with the outer chain plate, and the damping sealing ring is arranged between the outer chain link and the inner chain link.

13 Claims, 4 Drawing Sheets

(58) Field of Classification Search
USPC .......................................................... 474/109
See application file for complete search history.

(56) References Cited

U.S. PATENT DOCUMENTS

| | | | | |
|---|---|---|---|---|
| 6,159,122 | A * | 12/2000 | Kanehira | ................ F16G 13/04 |
| | | | | 474/212 |
| 9,046,150 | B2 * | 6/2015 | Motoshima | ............. F16G 13/04 |
| 9,469,379 | B2 * | 10/2016 | McGarry | ................. B62M 9/16 |
| 2007/0155564 | A1 * | 7/2007 | Ledvina | ................. F16G 13/04 |
| | | | | 474/215 |
| 2008/0020878 | A1 * | 1/2008 | Carl | ........................ B62M 9/16 |
| | | | | 474/133 |
| 2010/0004083 | A1 * | 1/2010 | Bongard | ................. F16G 13/04 |
| | | | | 474/212 |
| 2010/0120568 | A1 * | 5/2010 | Ogo | ........................ F16G 13/04 |
| | | | | 474/230 |
| 2010/0234154 | A1 * | 9/2010 | Klieber | ............... B62K 25/286 |
| | | | | 474/140 |

FOREIGN PATENT DOCUMENTS

| | | | |
|---|---|---|---|
| CN | 104565205 | A | 4/2015 |
| CN | 112610664 | A | 4/2021 |
| JP | 2005180601 | A | 7/2005 |

OTHER PUBLICATIONS

Written Opinion of the International Search Authority in corresponding International application No. PCT/CN2021/089493.

* cited by examiner

SILENT DRIVE CHAIN SYSTEM FOR MOTORCYCLE REAR DRIVE AND MOTORCYCLE

CROSS-REFERENCE TO RELATED APPLICATION(S)

This application is a continuation of co-pending International Patent Application No. PCT/CN2021/089493, filed on Apr. 25, 2021, which claims the priority and benefit of Chinese patent application number 202011336533.9, filed Nov. 25, 2020 with China National Intellectual Property Administration, the entire contents of which are incorporated herein by reference.

TECHNICAL FIELD

The present disclosure relates to the field of motorcycle chain drive technologies, which covers motorcycles driven by engines, motors and the like, and in particular, to a chain drive system for a motorcycle rear drive and a motorcycle.

BACKGROUND

At present, a rear drive mode of motorcycles is mainly chain drive, which solves the drive problem of motorcycles through the chain drive between an output shaft of an engine and a rear axle shaft.

In the design of the prior art, the chain structure used in the rear drive of a motorcycle is a roller chain. In addition to the features that the chain drive structure is simple in structure, light, low in cost and easy to maintain, another important reason is that a motorcycle rear fork after the installation of a driving wheel vibrates during vigorous exercise, and a certain margin can be given when the tightness of the chain is adjusted, so as to adapt to the vibration of the rear fork and maintain the drive between the engine and a rear axle.

However, with the continuous development of the industry, the existing chain drive system for a motorcycle rear drive has increasingly highlighted its technical limitations, which are embodied in.

With the increasing demand for large-displacement cruising, traveling, cross-country, racing motorcycles and high-end high-speed electric motorcycles, it is difficult for the conventional chain drive system to meet personalized needs for low noise of the motorcycles, and there is an increasing demand especially for reduction of rear drive chain drive noise of high-end electric motorcycles and high-end large-displacement motorcycles such as cruising and traveling motorcycles and motorcycles for running along a street. Even if the patent No. 202020979030.2 titled NOISE REDUCTION CHAIN WHEEL FOR DRIVE adopts a chain wheel encapsulation design, which can buffer the impact of a roller and gear teeth during high-speed drive of the chain, and reduce the drive noise to a certain extent, as the encapsulation buffer capability decreases, the noise reduction capability is gradually decreasing, and the personalized needs for low noise of high-end motorcycles cannot be effectively met. In addition, when too much reserved tightness margin of the chain during the installation of the chain or excessive wear and elongation after the use of the chain may also increases the drive noise of the chain drive system, and may further cause a speedometer sensor to fail, aggravate wear of a chain and a chain wheel, cause the chain to be separated from the chain wheel, or cause other dangers.

SUMMARY

To solve the problems existing in the prior art, the present disclosure provides a silent drive chain system for a motorcycle rear drive, which overcomes the technical limitations of conventional chain drive through an innovative design of a silent drive chain of a motorcycle and a chain drive system thereof, enables the motorcycle to maintain the stability and low noise of the chain drive system during high-speed and vigorous exercise, meets personalized needs for low noise and high wear resistance of high-end motorcycles, and can effectively avoid dangerous accidents.

To achieve the foregoing objective, the technical solution of the present disclosure is as follows:

A silent drive chain system for a motorcycle rear drive, including a small chain wheel, a large chain wheel and a silent drive chain in drive connection between the small chain wheel and the large chain wheel, where the small chain wheel is detachably and fixedly connected to an output shaft of a motor or an engine of a motorcycle, the large chain wheel is detachably and fixedly connected to a rear axle of the motorcycle, and the silent drive chain is a toothed chain and includes: an outer chain plate, inner chain plates, a guide plate, a pin, a sleeve and a damping sealing ring, the sleeve is in interference fit with mounting holes of the inner chain plate and the guide plate and forms an inner chain link together with the inner chain plate and the guide plate, the pin penetrates into the sleeve and is in clearance fit with the sleeve, two ends of the pin are in interference fit with a mounting hole of the outer chain plate and form an outer chain link together with the outer chain plate, and the damping sealing ring is arranged between the outer chain link and the inner chain link.

Preferably, the guide plate is located in the middle of the outer surface of the sleeve, the inner chain plates are symmetrically mounted on both sides of the guide plate, the damping sealing ring is sleeved at the end of the sleeve, and the inner and outer end faces of the damping sealing ring abut against the outer surface of the inner chain plate and the inner surface of the outer chain plate respectively.

Preferably, the meshing of the silent drive chain with the small chain wheel and the large chain wheel is an internal and external composite meshing mechanism or the meshing of the silent drive chain with the large chain wheel is an internal meshing mechanism; and the small chain wheel and the large chain wheel each have 13-72 teeth.

Preferably, the silent drive chain system for a motorcycle rear drive further includes a chain support, where the chain support includes an inverted U-shaped bracket and a supporting part connected between openings at the bottom of the bracket, the top end of the bracket is detachably and fixedly connected to the outer surface of one side of a motorcycle rear fork close to the large chain wheel, the silent drive chain penetrates through the bracket and is used in conjunction with the supporting part, and the supporting part is made of a light wear-resistant material.

Preferably, tooth profiles of the small chain wheel and the large chain wheel may be an involute tooth profile or a linear tooth profile; the large chain wheel and the small chain wheel have a tooth profile pressure angle of the involute tooth profile being 30°-40°; and the inner chain plate and an outer chain plate of the silent drive chain have a tooth profile half-angle of 30°-40°.

Preferably, the inner chain plate and the outer chain plate of the silent drive chain have a tooth profile half-angle of 35°.

Preferably, the large chain wheel and the small chain wheel each have an involute tooth profile and have a pressure angle of 35°.

Preferably, the damping sealing ring has an O-shaped, X-shaped, +-shaped, M-shaped, or Z-shaped cross section.

Preferably, the supporting part has a plate-shaped structure or a roller structure.

Preferably, the supporting part is made of PA46 or PA66 material.

Preferably, a motorcycle is provided, where the motorcycle is provided with the silent drive chain system for a motorcycle rear drive.

The silent drive chain system for a motorcycle rear drive and the motorcycle according to the present disclosure have the following beneficial effects:

(1) The present disclosure implements the internal meshing mechanism or the internal and external composite meshing mechanism of the silent drive chain (toothed chain) and the chain wheel through the innovative structural design of the silent drive chain, and reduces the polygon effect in the previous motorcycle roller chain drive process, so that the chain drive is more stable. The needs for low noise and high wear resistance of the rear drive chain drive of high-end motorcycles, and especially high-speed electric motorcycles are effectively met.

(2) The present disclosure overcomes the technical limitation of the conventional motorcycle drive chain drive, adopts the toothed chain structure design with the sleeve provided with the damping sealing ring, boldly uses the guiding mode of the internally guided toothed chain drive, makes the chain drive system more stable and reliable, greatly improves the efficiency and endurance life of the chain drive, and reduces the noise of the chain drive.

(3) By adding a chain support structure design to the chain drive system for a motorcycle rear drive, the present disclosure reduces the drive noise of the chain drive system, eliminates the risks such as speedometer sensor failure and chain separation from the chain wheel caused by the excessively long chain, can improve the wear resistance, fatigue resistance and stability of the chain drive, and better realizes silent drive.

Figure 1:
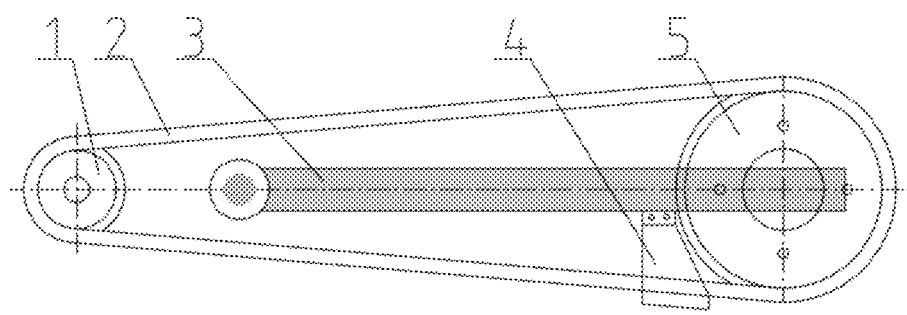
FIG. 1 is a schematic structural front view of a silent drive chain system for a motorcycle rear drive according to the present disclosure.

1: small chain wheel; 2: silent drive chain; 3: motorcycle rear fork; 4: chain support; 5: large chain wheel, 6: outer chain plate; 7: inner chain plate; 8: guide plate: 9: damping sealing ring; 10: pin; 11: sleeve; 12: bracket; 13: supporting part.

DESCRIPTION OF THE EMBODIMENTS

The following is a detailed description of the implementation of the present disclosure in a stepwise manner. The description is only a preferred embodiment of the present disclosure, and is not intended to limit the protection scope of the present disclosure. Any modification, equivalent replacement, improvement and the like made within the spirit and principle of the present disclosure shall fall within the protection scope of the present disclosure.

In the description of the present disclosure, it should be noted that orientations or position relationships indicated by the terms "up", "down", "left", "right", "top", "bottom", "inner", "outer", etc. are orientation or position relationships as shown in the accompanying drawings, and these terms are just used to describe the present disclosure and simplify the description, but not to indicate or imply that the mentioned device or elements must have a specific orientation and must be established and operated in a specific orientation, and thus, these terms cannot be understood as a limitation to the present disclosure.

Embodiment 1

As shown in FIGS. 1-6, a silent drive chain system for a motorcycle rear drive includes a small chain wheel 1, a large chain wheel 5 and a silent drive chain 2 in drive connection between the small chain wheel 1 and the large chain wheel 5, where the small chain wheel 1 is detachably and fixedly connected to an output shaft of a motor or an engine of a motorcycle, the large chain wheel 5 is detachably and fixedly connected to a rear axle of the motorcycle, and the silent drive chain 2 is a toothed chain and includes: an outer chain plate 6, inner chain plates 7, a guide plate 8, a pin 10, a sleeve 11 and a damping sealing ring 9; the sleeve 11 is in interference fit with mounting holes of both the inner chain plate 7 and the guide plate 8 and forms an inner chain link together with the inner chain plate 7 and the guide plate 8, the pin 10 penetrates into the sleeve 11 and is in clearance fit with the sleeve 11, two ends of the pin 10 are in interference fit with a mounting hole of the outer chain plate 6 and form an outer chain link together with the outer chain plate 6, and the damping sealing ring 9 is arranged between the outer chain link and the inner chain link.

The conventional motorcycle rear drive chain is a roller chain. Although the conventional motorcycle rear drive chain is simple in structure, light and easy to maintain and facilitates adjustment of the tightness margin, and can meet the needs for use of conventional motorcycles, as described in the background art of the present disclosure, with the rapid development of large-displacement cruising, travel, cross-country, racing motorcycles and high-end high-speed electric motorcycles, the use of conventional roller chains is becoming more and more limited, and the roller chain cannot meet the development needs especially in terms of silencing. Based on the above reasons, the present disclosure provides the silent drive chain 2 with a toothed chain structure, which can significantly improve the silencing effect of the motorcycle while fully meeting the load strength of the motorcycle.

Embodiment 2

On the basis of Embodiment 1, this embodiment has been further improved, specifically as follows.

As shown in FIGS. 1-6, the guide plate 8 is located in the middle of the outer surface of the sleeve 11, the inner chain plates 7 are symmetrically mounted on both sides of the guide plate 8, the damping sealing ring 9 is sleeved at the end of the sleeve 11, and the inner and outer end faces of the damping sealing ring 9 abut against the outer surface of the adjacent inner chain plate 7 and the inner surface of the outer chain plate 6 respectively.

Embodiment 3

On the basis of Embodiment 2, this embodiment has been further improved, specifically as follows.

The meshing of the silent drive chain 2 with the small chain wheel 1 and the large chain wheel 5 is an internal and external composite meshing mechanism or the meshing of the silent drive chain 2 with the large chain wheel 5 is an internal meshing mechanism.

Embodiment 4

On the basis of Embodiment 3, this embodiment has been further improved, specifically as follows.

Figure 2:
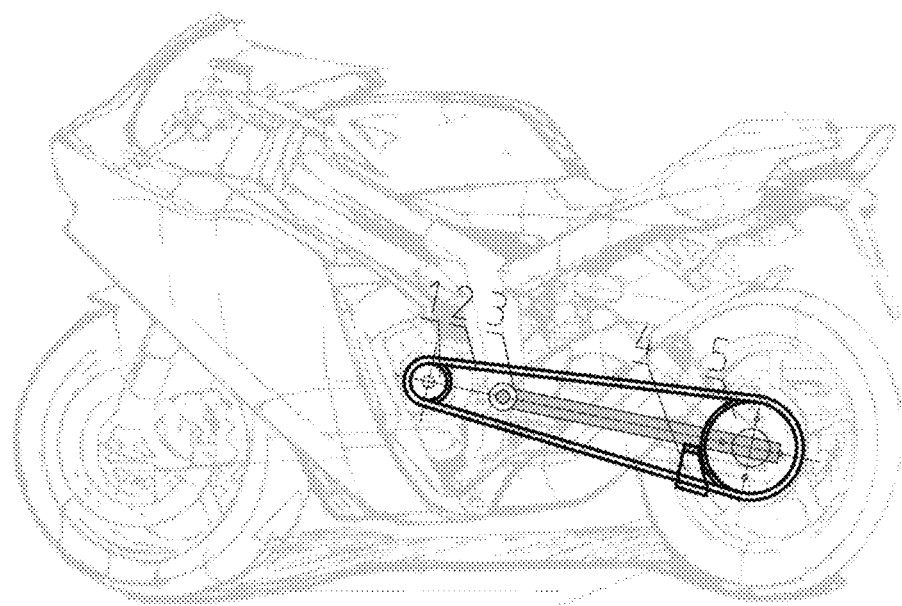
FIG. 2 is a schematic structural diagram of a silent drive chain system for a motorcycle rear drive on a motorcycle according to the present disclosure.
Figure 3:
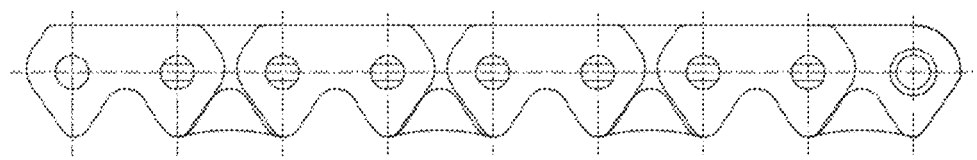
FIG. 3 is a schematic structural front view and vertical view of a silent drive chain according to the present disclosure.
Figure 3:
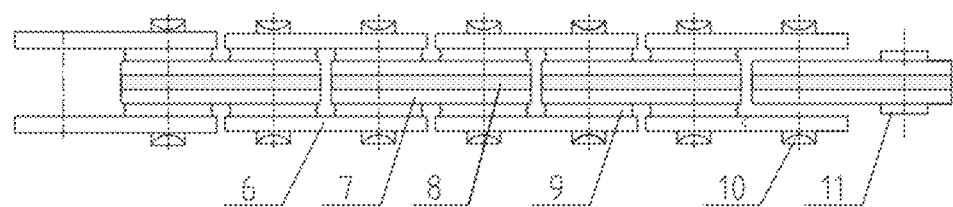
Figure 4:
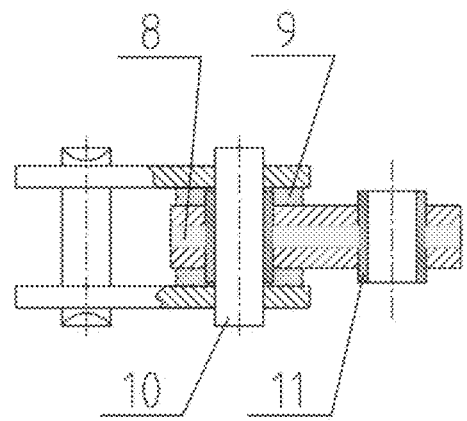
FIG. 4 is a structural schematic vertical view of a mating relationship between various components of a silent drive chain according to the present disclosure.
Figure 5:
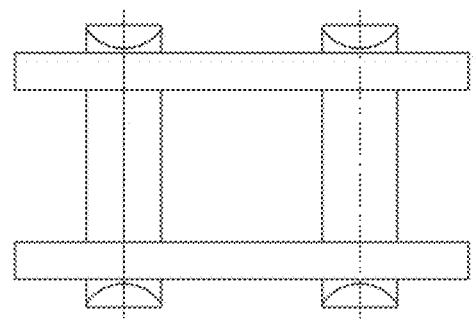
FIG. 5 is a schematic structural vertical view of an outer chain link of a silent drive chain according to the present disclosure.
Figure 6:
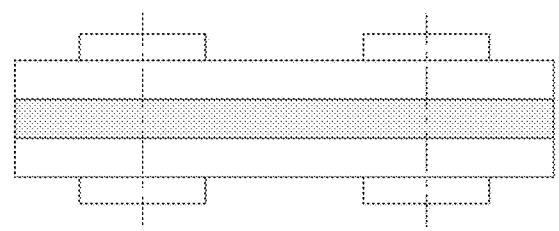
FIG. 6 is a schematic structural vertical view of an inner chain link of a silent drive chain according to the present disclosure.
Figure 9:
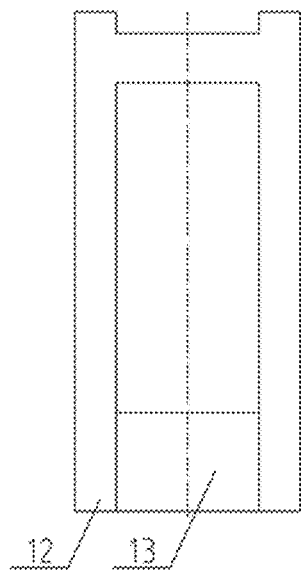
FIG. 9 is a schematic structural front view of a chain support of a silent drive chain system according to the present disclosure.

As shown in FIGS. 1, 2 and 9, the silent drive chain system for a motorcycle rear drive further includes a chain support 4, where the chain support 4 includes an inverted U-shaped bracket 12 and a supporting part 13 connected between openings at the bottom of the bracket 12, the top end of the bracket 12 is detachably and fixedly connected to the outer surface of one side of a motorcycle rear fork 3 close to the large chain wheel 5, the silent drive chain 2 penetrates through the bracket 12 and is used in conjunction with the supporting part 13, and the supporting part is made of a light wear-resistant material.

Embodiment 5

On the basis of Embodiment 4, this embodiment has been further improved, specifically as follows.

Figure 7:
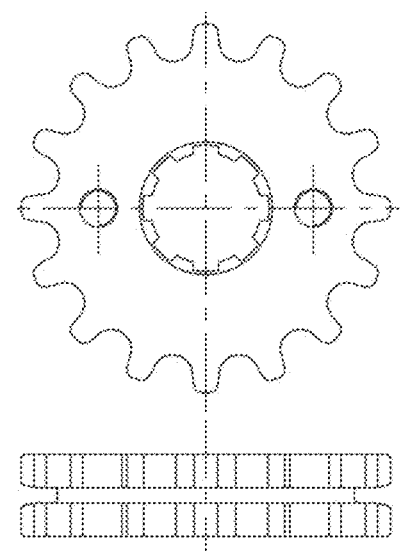
FIG. 7 is a schematic structural front view and vertical view of a small chain wheel of a silent drive chain system according to the present disclosure.
Figure 8:
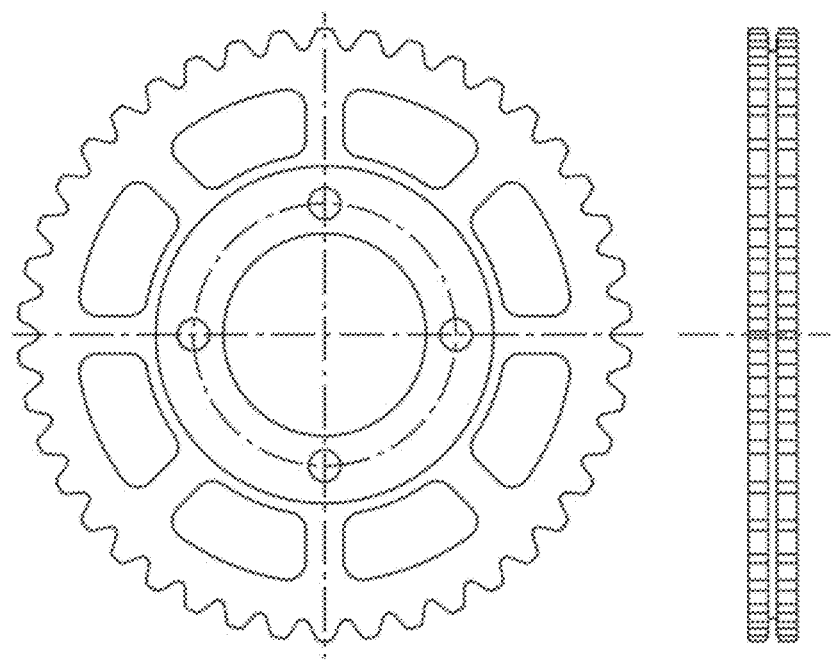
FIG. 8 is a schematic structural front view and right view of a large chain wheel of a silent drive chain system according to the present disclosure.

As shown in FIGS. 7 and 8, the small chain wheel 1 has 16 teeth or 15 teeth, and preferably has 16 teeth in this embodiment; the large chain wheel 5 has 51 teeth; tooth profiles of the small chain wheel 1 and the large chain wheel 5 are an involute tooth profile; the large chain wheel and the small chain wheel have a tooth profile pressure angle of the involute tooth profile being 300; and the inner chain plate 7 and an outer chain plate 6 of the silent drive chain 2 have a tooth profile half-angle of 30°.

Embodiment 6

On the basis of Embodiment 4, this embodiment has been further improved, specifically as follows.

The large chain wheel and the small chain wheel have a tooth profile pressure angle of the involute tooth profile being 40°; and the inner chain plate 7 and an outer chain plate 6 of the silent drive chain 2 have a tooth profile half-angle of 40°.

Embodiment 7

On the basis of Embodiment 4, this embodiment has been further improved, specifically as follows.

The small chain wheel 1 and the large chain wheel 5 each have a linear tooth profile.

Embodiment 8

On the basis of Embodiment 4, this embodiment has been further improved, specifically as follows.

As shown in FIGS. 7 and 8, the inner chain plate 7 and the outer chain plate 6 of the silent drive chain 2 have a tooth profile half-angle of 35°.

Embodiment 9

On the basis of Embodiment 4, this embodiment has been further improved, specifically as follows.

As shown in FIGS. 7 and 8, the large chain wheel 5 and the small chain wheel 1 each have an involute tooth profile and have a pressure angle of 35°.

Embodiment 10

On the basis of the above embodiment, this embodiment has been further improved, specifically as follows.

The damping sealing ring has a +-shaped cross section.

Embodiment 11

On the basis of Embodiment 10, this embodiment has been further improved, specifically as follows.

As shown in FIG. 9, the supporting part 13 has a plate-shaped structure.

Embodiment 12

On the basis of Embodiment 10, this embodiment has been further improved, specifically as follows.

The supporting part 13 has a roller structure (not drawn in the figure).

Embodiment 13

On the basis of Embodiments 11 and 12, this embodiment has been further improved, specifically as follows.

The supporting part 13 is made of PA66 material.

Embodiment 14

On the basis of the above embodiment, this embodiment further discloses:

a motorcycle, where the motorcycle is provided with the silent drive chain system for a motorcycle rear drive.

Experimental Example

Figure 10:
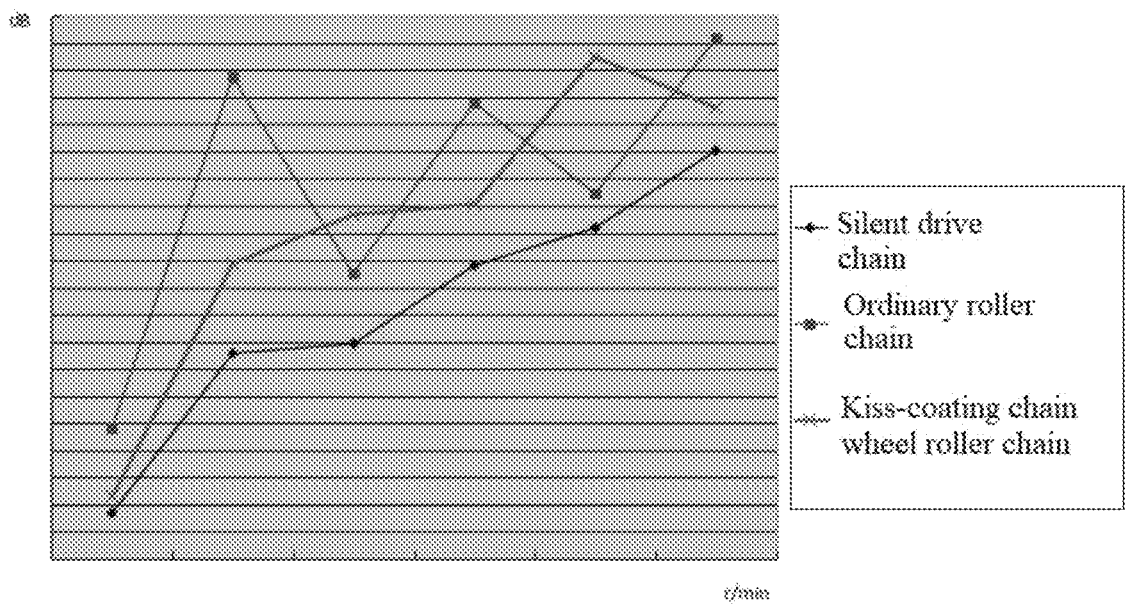
FIG. 10 is a schematic diagram illustrating a relationship between noise of silent drive chain drive, ordinary roller chain drive and kiss-coating chain wheel roller chain drive and the rotating speed of a small chain wheel according to the present disclosure.

Based on the above embodiments, the present disclosure has been verified through experiments, and the obtained data is shown in FIG. 10. The comparison results of noise tests of the silent drive chain drive, the ordinary roller chain drive and the kiss-coating chain wheel roller chain drive are as follow. (1) The noise of the silent drive chain drive is 2-7 decibels less than that of the ordinary roller chain drive; (2) the noise of the silent drive chain drive is 1-6 decibels less than that of the kiss-coating chain wheel roller chain drive; and (3) noise changes of the silent drive chain drive are relatively stable compared with those of the ordinary roller chain drive and the kiss-coating chain wheel roller chain drive.

The working principle of the present disclosure is as follows.

1. The present disclosure greatly reduces the drive noise of the motorcycle drive chain through the guiding mode of the internally guided toothed chain drive.

2. Based on the above, the present disclosure also has the damping sealing ring 9 between the inner chain link and the outer chain link. The damping sealing ring 9 can prevent external sand and dust from entering the inside of the chain and speeding up the wear of the pin 10 and the sleeve 11, can also prevent lubricating oil in the chain from overflowing and causing dry friction between the pin 10 and the sleeve 11, and can also eliminate the collision friction between the inner chain plate 7 and the outer chain plate 6, which can improve the wear resistance of the chain, prolong the service life and can further reduce the noise of the chain drive.

3. The silent drive chain 2 of the present disclosure takes the form of a toothed chain, which breaks through the conventional roller chain drive method. Under the condition of fully meeting the large load of the motorcycle, the internal meshing or internal and external meshing transmission is implemented, which can maintain the stable drive of the motorcycle rear drive, and can further reduce the drive noise on the basis of the above.

4. The present disclosure is further provided with the chain support 4, so that through the chain support 4, the present disclosure can eliminate the risks such as speedometer sensor failure and chain separation from the chain wheel caused by the excessively long chain, improve the stability of the chain drive, and better realize silent chain drive.

What is claimed is:

1. A silent drive chain system for a motorcycle rear drive, comprising a small chain wheel, a large chain wheel and a silent drive chain in drive connection between the small chain wheel and the large chain wheel, wherein the small chain wheel is detachably and fixedly connected to an output shaft of a motor or an engine of a motorcycle, the large chain wheel is detachably and fixedly connected to a rear axle of the motorcycle, and the silent drive chain is a toothed chain and comprises: an outer chain plate, inner chain plates, a guide plate, a pin, a sleeve and a damping sealing ring; the sleeve is in interference fit with mounting holes of both the inner chain plate and the guide plate and forms an inner chain link together with the inner chain plate and the guide plate, the pin penetrates into the sleeve and is in clearance fit with the sleeve, two ends of the pin are in interference fit with a mounting hole of the outer chain plate and form an outer chain link together with the outer chain plate, and the damping sealing ring is arranged between the outer chain link and the inner chain link;

wherein the silent drive chain system further comprises a chain support, and the chain support comprises an inverted U-shaped bracket and a supporting part connected between openings at the bottom of the bracket; wherein the supporting part is made of PA46 or PA66 material.

2. The silent drive chain system for a motorcycle rear drive according to claim 1, wherein the guide plate is located in the middle of the outer surface of the sleeve, the inner chain plates are symmetrically mounted on both sides of the guide plate, the damping sealing ring is sleeved at the end of the sleeve, and the inner and outer end faces of the damping sealing ring abut against the outer surface of the inner chain plate and the inner surface of the outer chain plate respectively.

3. The silent drive chain system for a motorcycle rear drive according to claim 2, wherein the meshing of the silent drive chain with the small chain wheel and the large chain wheel is an internal and external composite meshing mechanism or the meshing of the silent drive chain with the large chain wheel is an internal meshing mechanism; and the small chain wheel and the large chain wheel each have 13-72 teeth.

4. The silent drive chain system for a motorcycle rear drive according to claim 1, the top end of the bracket is detachably and fixedly connected to the outer surface of one side of a motorcycle rear fork close to the large chain wheel, the silent drive chain penetrates through the bracket and is used in conjunction with the supporting part.

5. The silent drive chain system for a motorcycle rear drive according to claim 3, wherein tooth profiles of the small chain wheel and the large chain wheel may be an involute tooth profile or a linear tooth profile; the large chain wheel and the small chain wheel have a tooth profile pressure angle of the involute tooth profile being 30°-40°; and the inner chain plate and an outer chain plate of the silent drive chain have a tooth profile half-angle of 30°-40°.

6. The silent drive chain system for a motorcycle rear drove according to claim 5, wherein the inner chain plate and the outer chain plate of the silent drive chain have a tooth profile half-angle of 35°.

7. The silent drive chain system for a motorcycle rear drive according to claim 5, wherein the large chain wheel and the small chain wheel each have an involute tooth profile and have a pressure angle of 35°.

8. The silent drive chain system for a motorcycle rear drive according to claim 1, wherein the damping sealing ring has an O-shaped, X-shaped, +-shaped, M-shaped, or Z-shaped cross section.

9. The silent drive chain system for a motorcycle rear drive according to claim 5, wherein the damping sealing ring has an O-shaped, X-shaped, +-shaped, M-shaped, or Z-shaped cross section.

10. The silent drive chain system for a motorcycle rear drive according to claim 4, wherein the supporting part has a plate-shaped structure or a roller structure.

11. A motorcycle, wherein the motorcycle is provided with the silent drive chain system for a motorcycle rear drive according to claim 1.

12. A motorcycle, wherein the motorcycle is provided with the silent drive chain system for a motorcycle rear drive according to claim 5.

13. A motorcycle, wherein the motorcycle is provided with the silent drive chain system for a motorcycle rear drive according to claim 10.

* * * * *